US011593642B2

(12) United States Patent
Kaur et al.

(10) Patent No.: US 11,593,642 B2
(45) Date of Patent: Feb. 28, 2023

(54) COMBINED DATA PRE-PROCESS AND ARCHITECTURE SEARCH FOR DEEP LEARNING MODELS

(71) Applicant: International Business Machines Corporation, Armonk, NY (US)

(72) Inventors: Jassimran Kaur, Chandigarh (IN); Tarun Tater, Bangalore (IN); Anush Sankaran, Bangalore (IN); Naveen Panwar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 16/588,032

(22) Filed: Sep. 30, 2019

(65) Prior Publication Data

US 2021/0097383 A1    Apr. 1, 2021

(51) Int. Cl.
*G06N 3/08* (2006.01)
*G06N 20/00* (2019.01)
*G06F 11/34* (2006.01)
*G06N 3/04* (2023.01)

(52) U.S. Cl.
CPC ........... *G06N 3/08* (2013.01); *G06F 11/3466* (2013.01); *G06N 3/0445* (2013.01); *G06N 20/00* (2019.01)

(58) Field of Classification Search
CPC ........ G06N 3/08; G06N 20/00; G06N 3/0445; G06F 11/3466
USPC .......................................................... 706/16
See application file for complete search history.

(56) References Cited

U.S. PATENT DOCUMENTS

| 11,436,615 | B2* | 9/2022 | Fang | H04L 63/20 |
| 2016/0358099 | A1 | 12/2016 | Sturlaugson et al. | |
| 2017/0213101 | A1 | 7/2017 | Rubens et al. | |
| 2019/0043487 | A1* | 2/2019 | Rivkin | G06N 5/003 |
| 2020/0012941 | A1* | 1/2020 | Ukil | G06N 5/003 |
| 2020/0272909 | A1* | 8/2020 | Parmentier | G06N 20/00 |

(Continued)

FOREIGN PATENT DOCUMENTS

KR     101864286 B1     7/2018

OTHER PUBLICATIONS

Tran Ngoc Minh et al., Automated Image Data Preprocessing with Deep Reinforement Learning, published Jun. 15, 2018 via arXiv.org, pp. 1-9 (pdf).*

(Continued)

*Primary Examiner* — Manglesh M Patel
(74) *Attorney, Agent, or Firm* — Ryan, Mason & Lewis, LLP (57) ABSTRACT

Methods, systems, and computer program products for combined data pre-process and architecture search for deep learning models are provided herein. A computer-implemented method includes obtaining data corresponding to a deep learning task; performing, based on the deep learning task and the data, a multi-objective learning process to select an optimal combination of (i) a deep learning architecture for the deep learning task and (ii) a data pre-processing strategy to be applied to the data, the data pre-processing strategy comprising one or more pre-processing steps; pre-processing the data for the selected deep learning architecture based on the data pre-processing strategy; and providing the pre-processed data as input to the selected deep learning architecture to perform the deep learning task.

15 Claims, 8 Drawing Sheets

(56) References Cited

U.S. PATENT DOCUMENTS

| | | | |
|---|---|---|---|
| 2022/0067738 A1* | 3/2022 | Fang | G06Q 20/0655 |
| 2022/0067752 A1* | 3/2022 | Fang | H04L 63/1425 |
| 2022/0163387 A1* | 5/2022 | Wang | G01J 3/28 |
| 2022/0180066 A1* | 6/2022 | Wu | G06F 40/284 |

OTHER PUBLICATIONS

Joseph Giovanelli et al., Effective data pre-processing for AutoML, published 2021 via CEUR-WS.org, pp. 1-10 (pdf).*
Anh Truong et al., Towards Automated Machine Learning: Evaluation and Comparison of AutoML Approaches and Tools, published Sep. 3, 2019 via arxiv.org, pp. 1-9 (pdf).*
Mikhail Sarafanov, Clean AutoML for "Dirty" Data, published Apr. 14, 2022 via towardsdatascience.com, pp. 1-17 (pdf).*
Sunith Shetty, Use AutoML for Building simple to complex machine learning pipelines [Tutorial], published Jul. 27, 2018 via hub.packtpub.com, pp. 1-10.*
Jagreet Kaur Gill, "Data Preparation, Preprocessing and Wrangling in Deep Learning," xenonstack, Dec. 23, 2018.

* cited by examiner

| Layer (type) | Output Shape | Param # |
| --- | --- | --- |
| embedding_25 (Embedding) | (None, None, 128) | 2560000 |
| lstm_36 (LSTM) | (None, None, 128) | 131584 |
| lstm_37 (LSTM) | (None, 128) | 131584 |
| dense_20 (Dense) | (None, 1) | 129 |

Total params: 2,823,297
Trainable params: 2,823,297
Non-trainable params: 0

400

402 { embedding_25
404 { lstm_36, lstm_37
406 { dense_20

COMBINED DATA PRE-PROCESS AND ARCHITECTURE SEARCH FOR DEEP LEARNING MODELS

BACKGROUND

The present application generally relates to information technology and, more particularly, to implementing machine learning models.

Machine learning systems (such as Deep Learning (DL) systems, for example) typically require large amounts of data for training. Data obtained in real-world settings tend to be noisy, and often has various issues when applied to a machine learning context. For example, data may include imbalanced classes, errors in label annotations, missing values, incorrect values, and stop words. Pre-processing such data is a major bottleneck for deep leaning systems that often requires human intervention. Additionally, there is a large number of model architectures and solutions available for machine learning systems, which makes finding the best architecture difficult. Existing techniques for searching architectures assume input data are already cleaned and pre-processed, and do not alter the input data in any way.

SUMMARY

In one embodiment of the present invention, techniques for combined data pre-process and architecture search for deep learning models are provided. An exemplary computer-implemented method includes the steps of obtaining data corresponding to a deep learning task; perforating, based on the deep learning task and the data, a multi-objective learning process to select an optimal combination of (i) a deep learning architecture for the deep learning task and (ii) a data pre-processing strategy to be applied to the data, the data pre-processing strategy comprising one or more pre-processing steps; pre-processing the data for the selected deep learning architecture based art the data pre-processing strategy; and providing the pre-processed data as input to the selected deep learning architecture to perform the deep learning task.

Another exemplary computer-implemented method includes obtaining data corresponding to a machine learning task; iteratively sampling, based on the obtained machine learning task and the data, (i) a machine learning architecture from a plurality of learning architectures and (ii) at least one data pre-processing step, for pre-processing said data from a plurality of data pre-processing steps; training, based on results of said sampling at each iteration, a recurrent neural network to identify, in combination, (i) an optimal machine learning architecture from the plurality of machine learning architectures for said data and said machine learning task and (ii) one or more of the pre-processing steps for said optimal machine learning architecture.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

A network architecture search (NAS) refers to a process that attempts to find an optimal DL architecture given a particular task and a particular dataset. NAS typically assumes the input dataset has been cleaned and/or pre-processed, and NAS does not alter the dataset in arty way. Accordingly, existing approaches to NAS do not account for the quality and/or the cleanliness of the data.

Existing techniques for data pre-processing searches (DPS) require manual intervention, and thus are often a bottleneck in implementing DL systems. Existing DPS approaches also do not tailor the data to specific architectures but perform generic clouting of the data.

Example embodiments of the subject matter described herein include searching for an optimal data pre-processing strategy and optimal network architecture, together as a multi-objective task. Such embodiments recognize that the choice of pre-processing steps and the model architecture depends on the characteristics of both the machine learning task to be performed and the available data. The combined search allows an optimal architecture to be found for a particular dataset in an improved manner (e.g., in terms of computing efficiency and/or accuracy) relative to existing approaches.

According to one or more example embodiments, an end-to-end automated system is provided that improves the data quality and search for finding an optimal deep learning architecture for a given input dataset (e.g., a noisy input dataset). The end-to-end system may also be capable of providing explanations and reasoning for the obtained results. Additionally, at least one example embodiment provides a multi-objective learning process (e.g., a machine learning process) for learning the data pre-processing strategy and the network architecture in a combined fashion.

Figure 1:
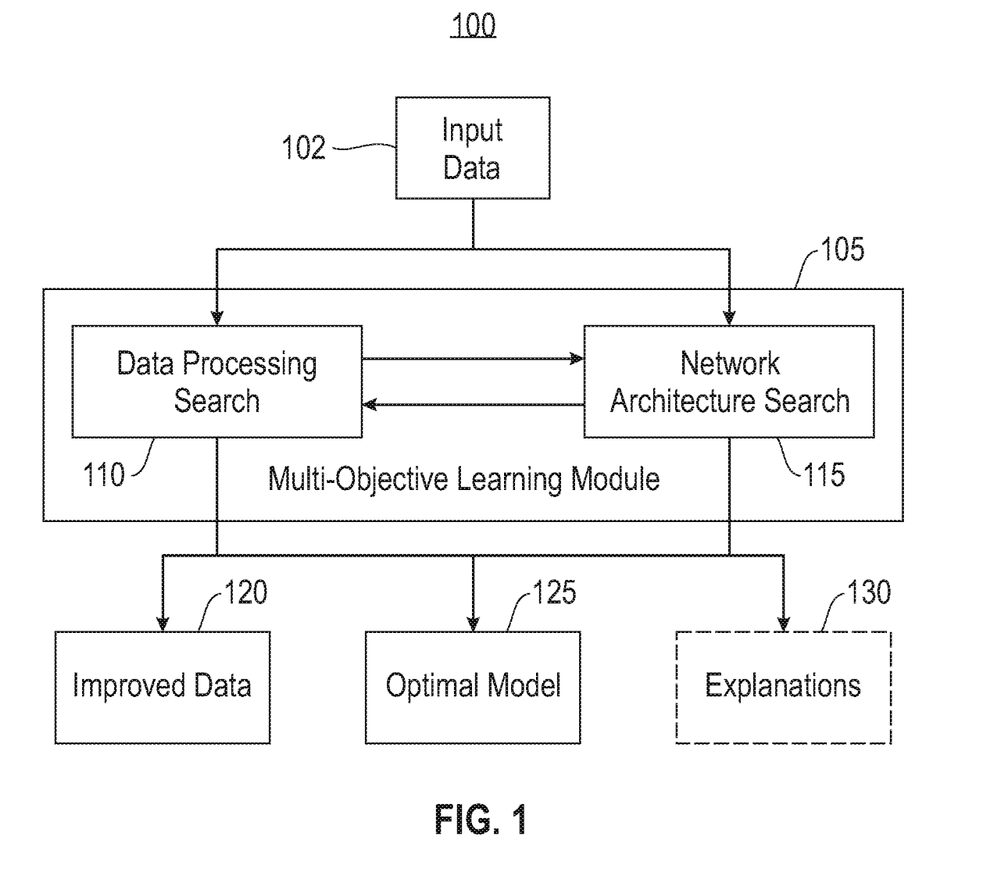
FIG. 1 is a diagram illustrating a system architecture according to an exemplary embodiment of the invention.

Referring now to FIG. 1, this figure is a diagram illustrating a system architecture 100 in accordance with exemplary embodiments. The system architecture 100 depicted in FIG. 1 includes a multi-objective learning module 105, which obtains input data 102. The multi-objective learning module 105 performs a combined data processing search 110 and network architecture search 115. In this example, the multi-objective learning module 105 selects and outputs one or more of an optimal model 125 and improved data 120. Optionally, the architecture 100 also generates and outputs explanations 130, which, for example, provide information on one or more of the techniques improved data 120 and the optimal model 125.

In accordance with one or more exemplary embodiments, the multi-objective learning module 105 extracts properties from the input data 120. For example, the multi-objective learning module 105 may extract one or more of the following properties:

1. a data type property (e.g., whether the data comprises image data, text data, audio data, video data, categorical data (e.g., sensor signal), etc.);
2. a metric property (such as accuracy property, mean squared error (MSE), error rate, etc.); and
3. a task property, such as whether the task (e.g., a deep learning task) to be performed includes one or more of: (i) an image task (e.g., classification, generation, segmentation, enhancement, or translation); (ii) a text task (e.g., classification, generation, tagging, noise removal, or translation); (iii) a speech task (e.g., classification, diarization, translation, or segmentation); (iv) a video task (e.g., classification, tracking, per-frame segmentation, or temporal segmentation); and (v) a multi-modal task.

In at least one exemplary embodiment, the multi-objective learning module 105 ranks architectures searches for models for a particular task and data similarity to rank the best possible models. Depending on the model, multi-objective learning module 105 infers the format of data that is expected as well as other properties (such as, for example, "Data Balance", "dimensions", etc.)

Figure 2:
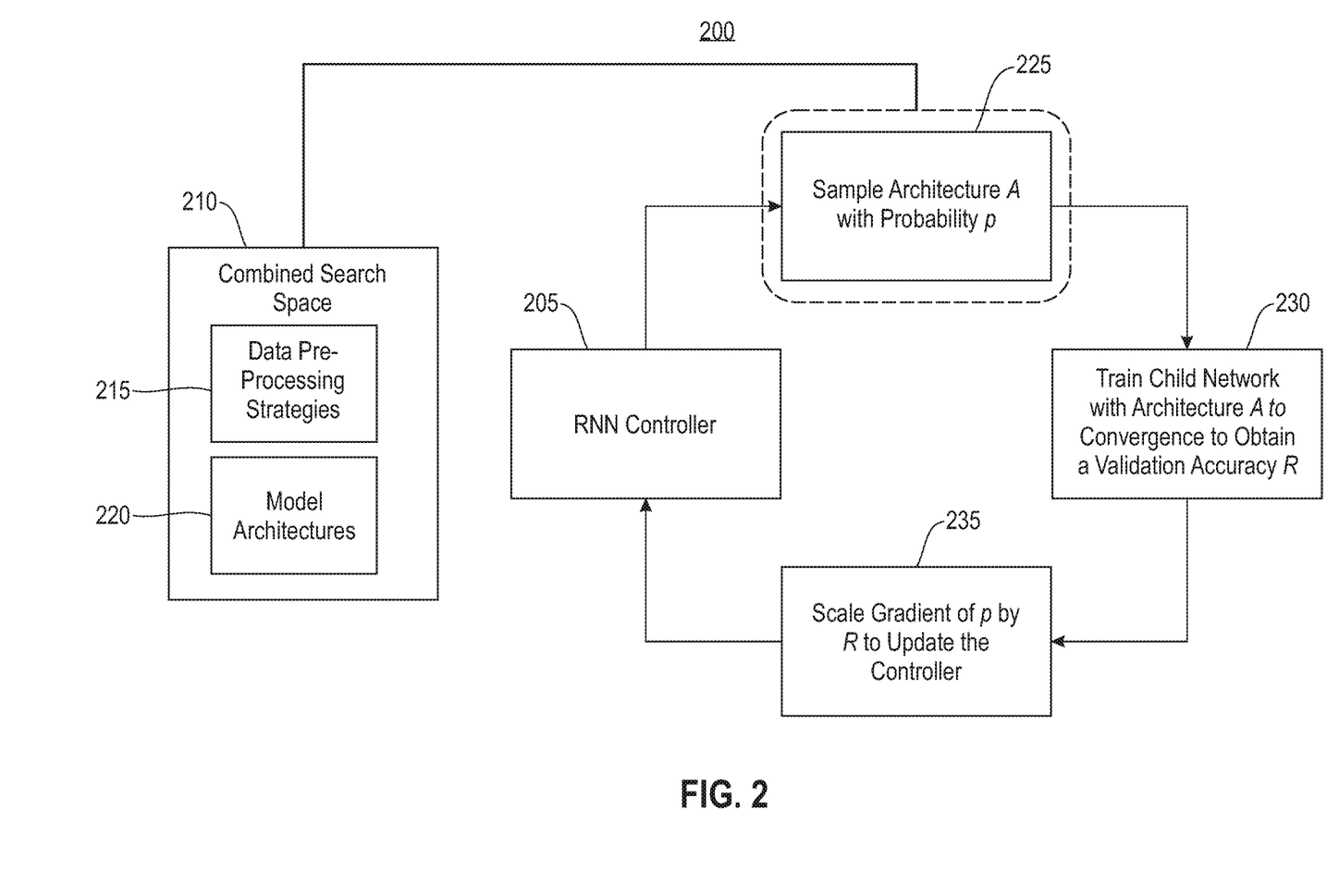
FIG. 2 is a process flow diagram that uses a network architecture search with indirect feedback in accordance with an exemplary embodiment.
Figure 3:
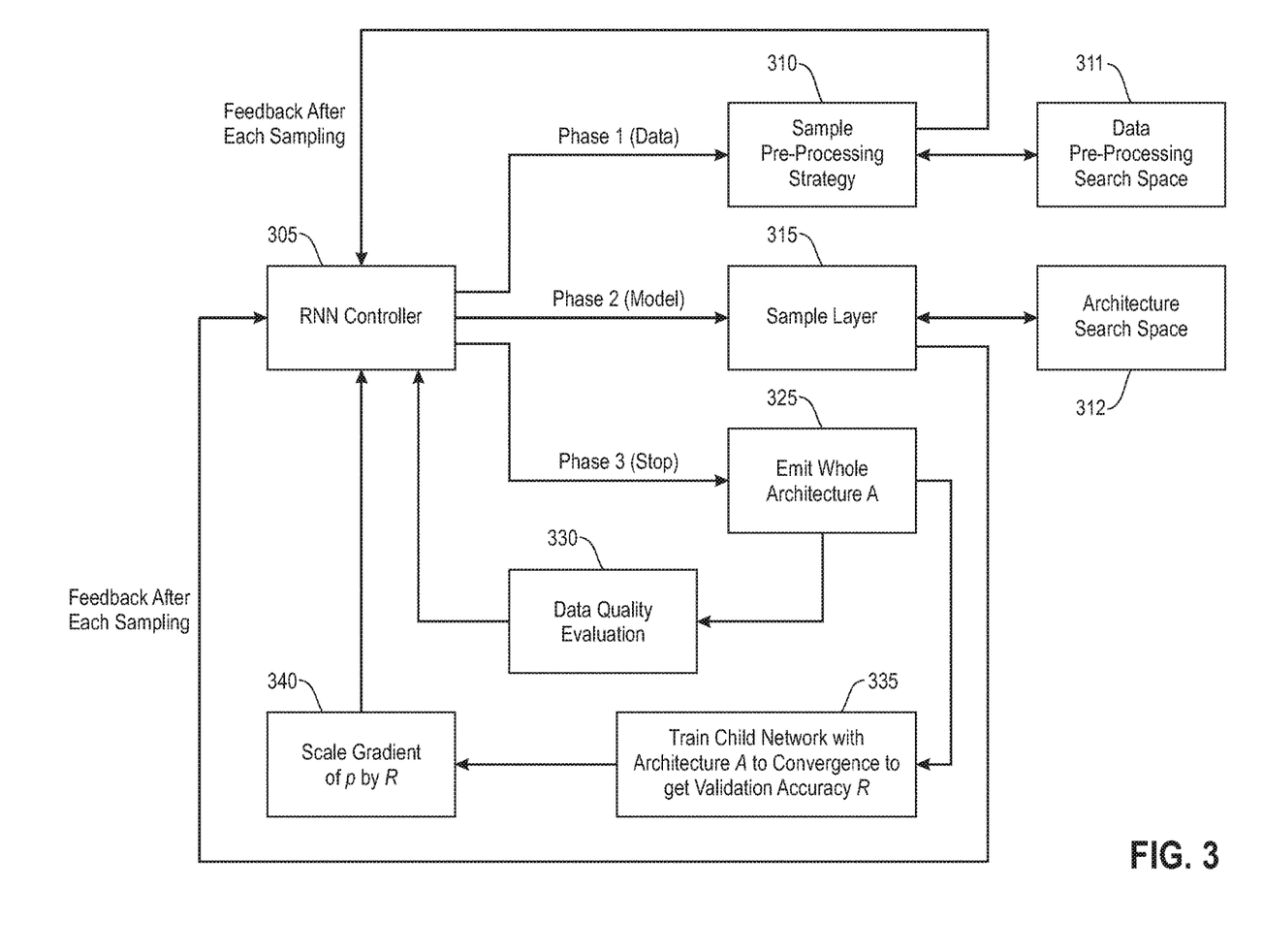
FIG. 3 is a process flow diagram that uses a network architecture search with direct feedback in accordance with an exemplary embodiment.

FIGS. 2 and 3 are process flow diagrams that use network architecture searches with indirect feedback and direct feedback, respectively, in accordance with exemplary embodiments. Direct feedback refers to when feedback is given explicitly, such as a factor of improvement in accuracy of task, for example. Indirect feedback refers to feedback that is learned implicitly as, for example, one of model hyperparameters. Generally, direct feedback requires less data as explicit feedback is given to the controller after each iteration. In case there is only a small amount of data, then explicit feedback may also be provided via user input, such as by a human expert, for example. Indirect feedback is generally more automated and generalizable, but also may require more data and time as more iterations may be needed to learn meaningful feedback.

Referring to FIG. 2, in this example, the process flow diagram depicts a combined search space 210 that includes data pre-processing strategies 215 and model architectures 220.

The data pre-processing strategies 215 may include, for example, one or more of: balancing classes across an input dataset (such as input data 102 in FIG. 1, for example), filling missing values of the dataset, detecting outliers in the dataset, augmenting data in the dataset, removing stop words in the dataset, performing a stemming algorithm on the dataset, etc. The model architectures 220 includes a plurality of different layers (e.g., a 3×3 Convolutional (Conv) Stride 2 layer, a 5×5 Conv Stride 2 layer, a Max Pool Kernel 2×2 layer, etc.).

The process depicted in FIG. 2 includes a recurrent neural network (RNN) controller 205 that samples an architecture A having probability value p from the combined search space 210 as shown at block 225. At block 230, the process trains a child network with architecture to convergence to obtain a validation accuracy, R. At block 235, a gradient of p is scaled by R, which is used to update the RNN controller 205. The process repeats until the RNN controller 205 learns to sample the best architecture in the combined search space 210.

Referring now to FIG. 3, this figure depicts a process flow diagram that uses a network architecture search with direct feedback in accordance with an exemplary embodiment. In this example, the RNN Controller 305 uses different phases, namely, Phase. 1 (data), Phase 2 (model), and Phase 3 (stop). The phases may be run in parallel asynchronously as well as in pipeline mode depending on time and/or resource constraints. Depending on a phase value of the RNN controller 305, the RNN controller 305 samples different data pre-processing strategies from data pre-processing search space 311, and different layers from the architecture search space 312 as depicted by blocks 310 and 315, respectively. Phase 1 (Data) includes sampling a layer (corresponding to a data pre-processing step, for example) from the data pre-processing search space 311 and applying that layer to input data. The modified data resulting from the data pre-processing is provided to the RNN controller 305. Phase 2 (Model) includes sampling a layer from the architecture search space 312 and providing that layer to the RNN controller 305. Feedback is provided to the RNN controller 305 after each sampling. During Phase 3 an entire architecture A is emitted as shown by step 325, which includes a data pre-processing strategy from search space 311 and an architecture, from the architecture search space 312. The architecture A is selected by sequentially combining the data preprocessing layers from Phase 1 and new model layers from Phase 2. The architecture A is then trained to a validation accuracy R as shown at block 335. A data quality evaluation 330, and feedback resulting from the data quality evaluations 330 is provided to the RNN controller 305. When a maximum number of epochs for reaching certain accuracy R is reached, a stop signal is sent to the RNN controller 305, which ends Phase 2 (Stop). At block 340, a gradient of a probability p is sealed by R, and the RNN controller 305 is updated based on the gradient, wherein p is the probability of sampling a given layer from the total architecture search space 312. Initially, all the layers in the architecture search space 312 have the same probability p. In this way, the RNN controller 305 is able to obtain direct feedback on the data quality for different samples in order to learn to select the best architecture for a given dataset.

As an example, the data quality evaluation 330 includes averaging one or more of the following values: a Structural Similarity (SSIM) Index, Mean-squared error (MSE), Blind/Reference-less Image Spatial Quality Evaluator (BRISQUE), Natural Image Quality Evaluator (NIQE), and Perception based Image Quality Evaluator (PIQE). It is to be appreciated that these values are not intended to be limiting, and the data quality evaluation 330 may also include other similar scores and/or variations of these values depending on the requirements of the given task.

According to one or more example embodiments, the quality of a dataset is improved so that it is output in a form that is consumable by a deep learning model. The output dataset (e.g., corresponding to improved data 120 of FIG. 1), may be an improved comma separated values (CSV) file or an improved free flow text data, as non-limiting examples. In some exemplary embodiments, the optimal DL model 125 that is output is searched for within a search space that is restricted based on the improved data 120. Some non-limiting examples of explanations 130 that are output by the multi-objective learning module 105 include: (i) an explanation indicating data balancing was performed as there was only 10% data for a particular class; (ii) an explanation that a weighted Adam optimizer was applied to correct bias for a particular class; (iii) an explanation that a hard attention mechanism was applied to learn only important keywords because the data included a large number of stop words; and (iv) an explanation that data numerical value normalization was performed to improve the performance of DL model.

Figure 4:
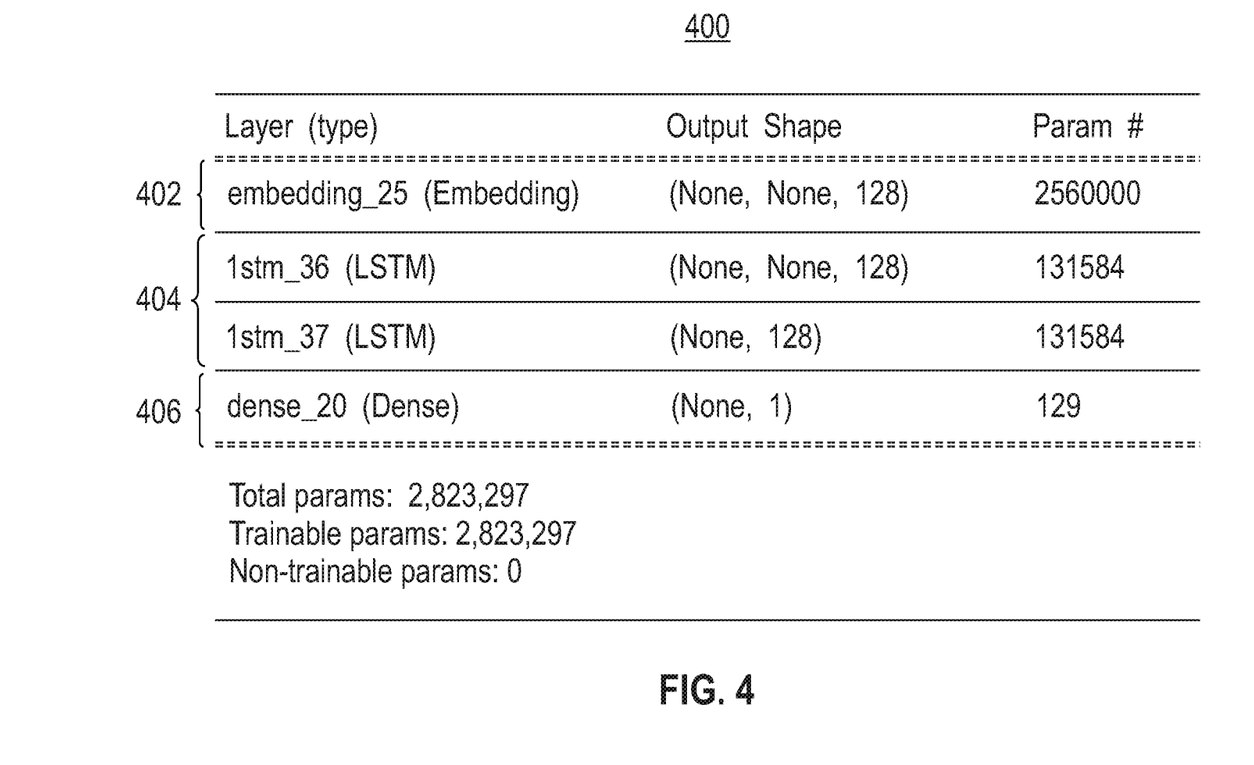
FIG. 4 is an example of a machine learning model in accordance with an exemplary embodiment of the invention.

By way of example, consider a user that wants to perform a machine learning task that classifies a genre of a movie based on the movie's description. In this example, the input dataset is a CSV file having various movie details (e.g., movie description, cost, director, actor, genre, release date, etc.). A system may be configured to infer the task is a classification machine learning task based on at least a portion of the strings (text) in the CSV file. The system may then search for machine learning models that have been trained for similar tasks. For example, FIG. 4 shows a table representing a machine learning model 400 that includes four layers, i.e., an embedding layer 402, two Long Short Term Memory (LSTM) layers 404, and a dense layer 406. The system may infer that the final layer in model 400 should be the number of classes in the label (e.g., 5) and then automatically updates the dense layer 406 in model 400 from 1 to 5.

Additionally, the system may infer various data pre-processing techniques that are required based on the task, the features, the labels, and/or the particular model. In the movie classification example, the system may infer that for each data instance only the text (i.e., strings) in certain columns of the CSV file are required for the classification task. In this case, the CSV file is ingested so that only the required columns are retained (e.g., the 'description' and 'genre' columns). The system may also infer that the following feature dependent pre-processing techniques should be performed since the dataset includes text data: removal of stop words, stemming, lemmatization, and removing sentences which have weblinks and html tags. Additionally, label dependent data pre-processing techniques (e.g., label balancing and improving the data variety for certain classes based on semantic similarity) can be inferred by the system based on metrics. Finally, the system may infer that, for each data-instance, one-hot encodings of text is required with the label for this particular model, and that sentences need to be padded or truncated if the model requires each data instance to have a fixed length.

Figure 5:
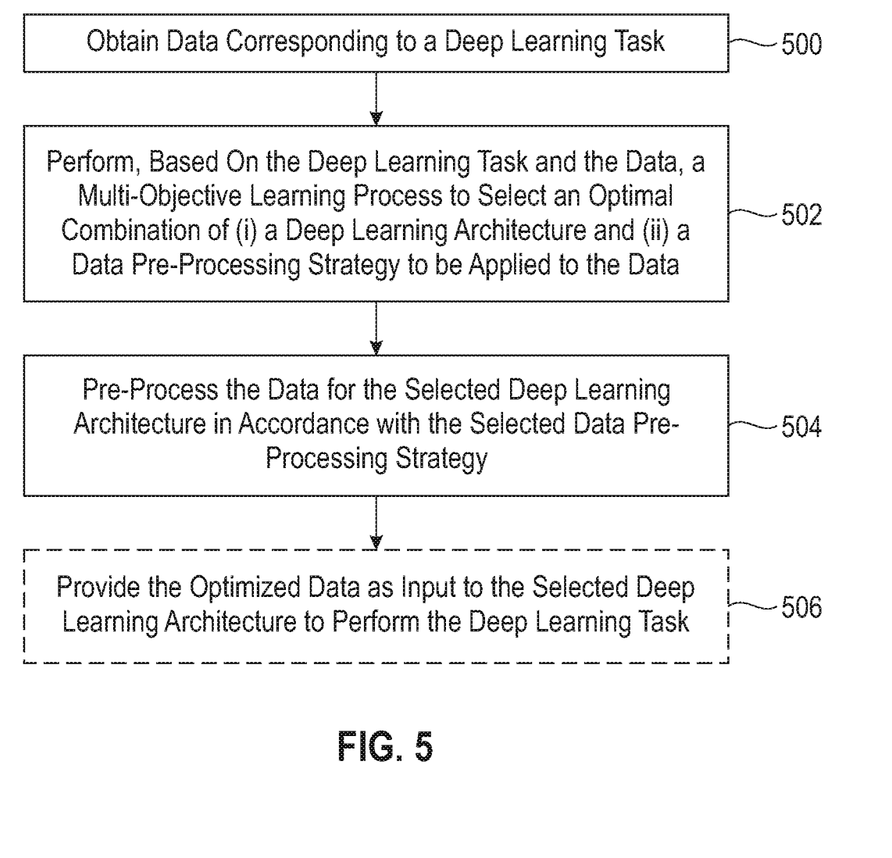
FIG. 5 is a flow diagram illustrating techniques according to an embodiment of the invention.

FIG. 5 is a flow diagram illustrating techniques according to an embodiment of the present invention. Step 500 includes obtaining data corresponding to a deep learning task. Step 502 includes performing, based on the deep learning task and the data, a multi-objective learning process to select an optimal combination of (i) a deep learning architecture for said deep learning task and (ii) a data pre-processing strategy to be applied to the data, the data pre-processing strategy comprising one or more preprocessing steps. Step 504 pre-processes the data for the selected deep learning architecture based on the data pre-processing strategy of the optimal combination. Optionally, step 506 includes providing the pre-processed data as input to the selected deep learning architecture to perform the deep learning task.

The multi-objective learning process may select the optimal combination by implementing at least one search space. The at least one search may include a combined search space comprising (i) a plurality of deep learning architectures and (ii) a plurality of data pre-processing steps. The at least one search space may include a first search space comprising a plurality of deep learning architectures and a second search space comprising a plurality of pre-processing steps. The multi-objective learning process may include training a recurrent neural network to rank combinations of deep learning architectures and data pre-processing strategies from the at least one search space, based on the data and the deep learning task, and wherein the optimal combination may be selected based on said ranking. The ranking may rank the combinations according to at least one performance metric for performing the deep learning task relative to other combinations. Each of the combinations may include at least one of: a deep learning architecture different from the other combinations, and a data pre-processing strategy different from the other combinations. Training the recurrent neural network may include: selecting a candidate deep learning architecture from the plurality of deep learning architectures; training a child network to convergence using the candidate deep learning architecture to obtain a validation accuracy; and updating the recurrent neural network based on at least in part on the obtained validation accuracy. The multi-objective learning process may include: extracting, from the data, at least one of: (i) at least one data type, (ii) a type of the deep learning task, and (iii) at least one of the performance metrics; and limiting, based on said extracting, at least one of (i) the combined search space and (ii) at least one of (a) the first search space and (b) the second search space. The at least one data type comprises one or more of: (i) an image data type, (ii) a text data type, (iii) an audio data type, (iv) a video data type, and (v) a categorical data type. The one or more data pre-processing steps may include at least one of: normalizing at least a portion of said data; balancing classes of said data; truncating at least a portion of said data; augmenting at least a portion of said data; detecting outliers in at least a portion of data; padding at least a portion of said data; performing a stemming algorithm on at least a portion of said data; and encoding at least a portion of said data. The process may include outputting information to a graphical user interface explaining the selection of the optimal combination.

According to another example embodiment, a computer-implemented process includes obtaining data corresponding to a machine learning task; iteratively sampling, based on the obtained machine learning task and the data, (i) a machine learning architecture from a plurality of learning architectures and (ii) at least one data pre-processing step for pre-processing said data from a plurality of data pre-processing steps; training, based on results of said sampling at each iteration, a recurrent neural network to identify, in combination, (i) an optimal machine learning architecture from the plurality of machine learning architectures for said data and said machine learning task and (ii) one or more of the pre-processing steps for said optimal machine learning architecture.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
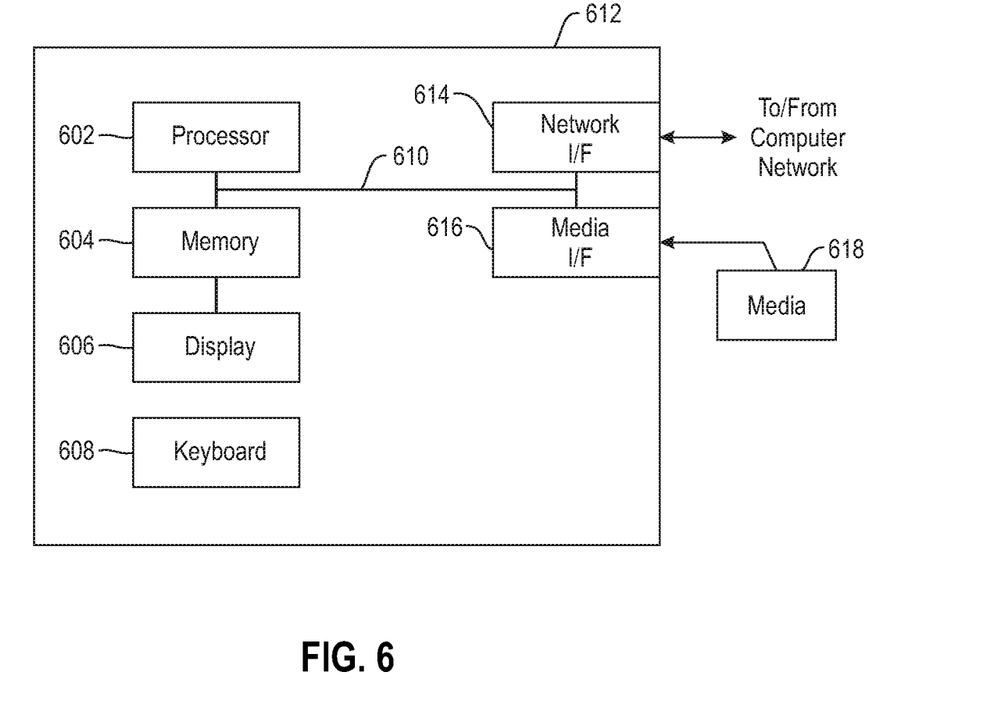
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a lee board 608. The term "processer" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects a the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
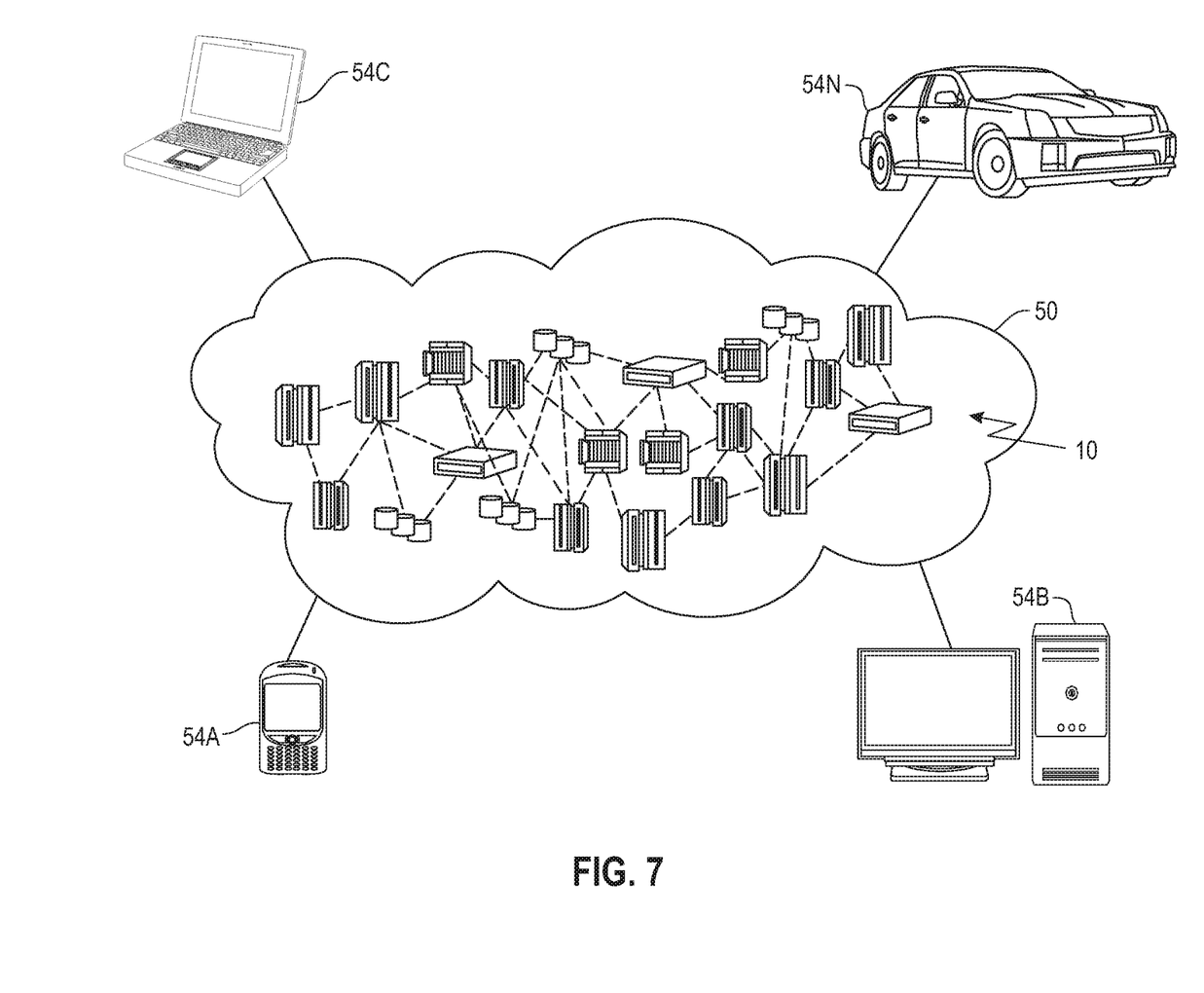
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
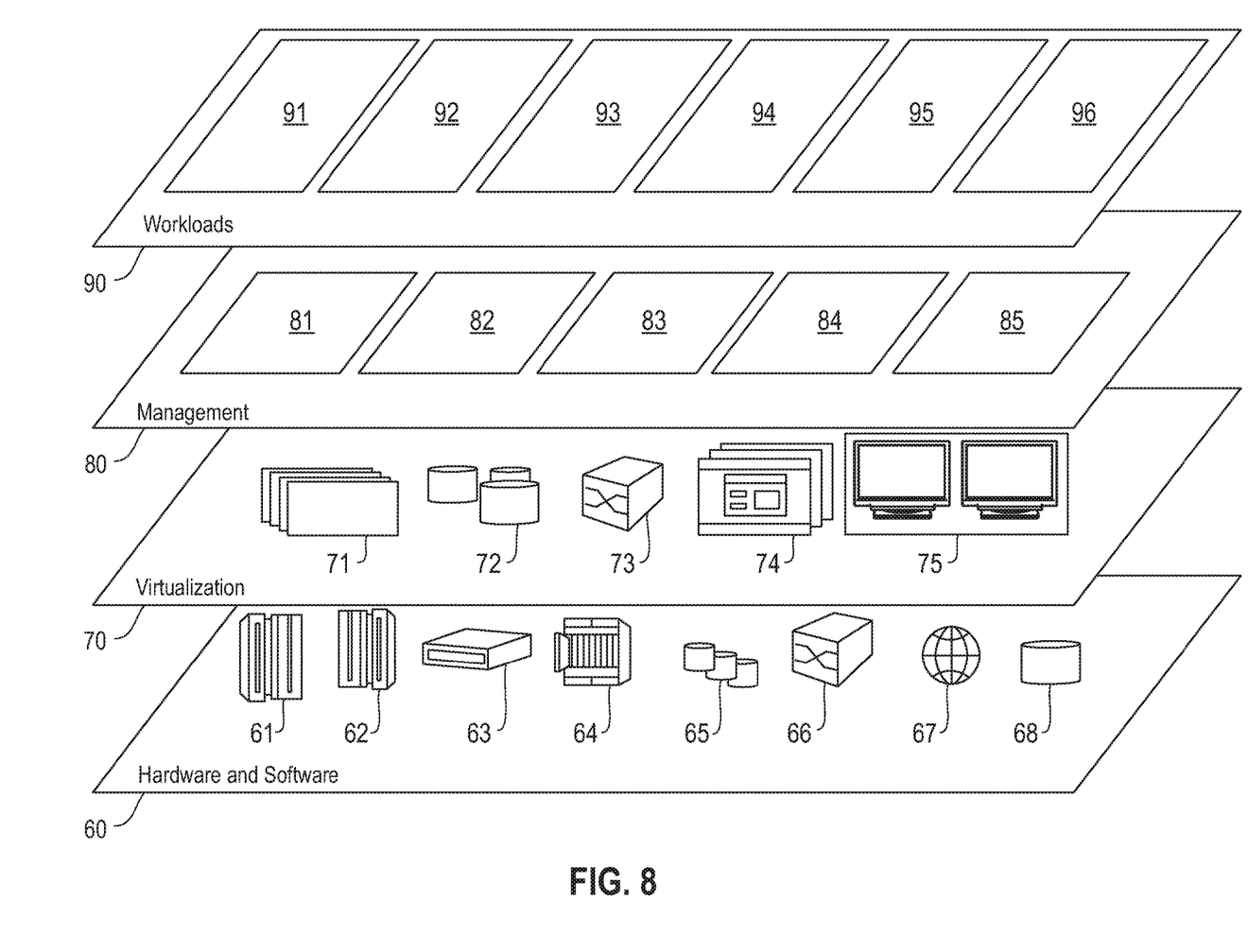
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92: virtual classroom education delivery 93; data analytics processing 94; transaction processing 95; and combined data pre-process and architecture search 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Without in any way limiting the scope, interpretation, or application of the claims appearing below, a technical effect of one or more of the example embodiments disclosed herein is improving the quality of data for a deep learning architecture. Another technical effect of one or more of the example embodiments disclosed herein is improving the accuracy and car efficiency of network architecture searches.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining data corresponding to a deep learning task;
    performing, based on the deep learning task and the data, a multi-objective learning process to select a combination of (i) at least one deep learning architecture for said deep learning task and (ii) a data pre-processing strategy to be applied to the data, the data pre-processing strategy comprising one or more pre-processing steps, wherein performing the multi-objective learning process comprises:
        implementing at least one search space, wherein the at least one search space comprises at least a first search space comprising a plurality of deep learning architectures and at least a second search space comprising a plurality of pre-processing steps;
        extracting, from the data, (i) at least one data type, (ii) a task type associated with the deep learning task, and (iii) one or more performance metrics associated with the deep learning task; and
        limiting, based at least in part on said extracting, the at least a first search space and the at least a second search space;
    pre-processing the data for the at least one selected deep learning architecture based on the data pre-processing strategy; and
    providing the pre-processed data as input to the selected deep learning architecture to perform the deep learning task;
    wherein the method is carried out by at least one computing device.

2. The computer-implemented method of claim 1, wherein the multi-objective learning process comprises training a recurrent neural network to rank combinations of deep learning architectures and data pre-processing strategies from the at least one search space, based on the data and the deep learning task, and wherein the combination is selected based on said ranking.

3. The computer-implemented method of claim 2, wherein said ranking ranks the combinations according to at least one performance metric for performing the deep learning task relative to other combinations.

4. The computer-implemented method of claim 2, wherein each of the combinations comprise at least one of: (i) a deep learning architecture different from the other combinations, and (ii) a data pre-processing strategy different from the other combinations.

5. The computer-implemented method of claim 2, wherein said training the recurrent neural network comprises:
    selecting a candidate deep learning architecture from the plurality of deep learning architectures;
    training a child network to convergence using the candidate deep learning architecture to obtain a validation accuracy; and
    updating the recurrent neural network based on at least in part on the obtained validation accuracy.

6. The computer-implemented method of claim 1, wherein the at least one data type comprises one or more of: (i) an image data type, (ii) a text data type, (iii) an audio data type, (iv) a video data type, and (v) a categorical data type.

7. The computer-implemented method of claim 1, wherein the one or more data pre-processing steps comprise at least one of:
    normalizing at least a portion of said data;
    balancing classes of said data;
    truncating at least a portion of said data;
    augmenting at least a portion of said data;
    detecting outliers in at least a portion of data;
    padding at least a portion of said data;
    performing a stemming algorithm on at least a portion of said data; and
    encoding at least a portion of said data.

8. The computer-implemented method of claim 1, comprising:
outputting information to a graphical user interface explaining the selection of the combination.

9. A computer program product comprising a computer readable storage medium having program instructions embodied therewith, the program instructions executable by a computing device to cause the computing device to:
obtain data corresponding to a deep learning task;
perform, based on the deep learning task and the data, a multi-objective learning process to select a combination of (i) at least one deep learning architecture for said deep learning task and (ii) a data pre-processing strategy to be applied to the data, the data pre-processing strategy comprising one or more pre-processing steps, wherein performing the multi-objective learning process comprises:
implementing at least one search space, wherein the at least one search space comprises at least a first search space comprising a plurality of deep learning architectures and at least a second search space comprising a plurality of pre-processing steps;
extracting, from the data, (i) at least one data type, (ii) a task type associated with the deep learning task, and (iii) one or more performance metrics associated with the deep learning task; and
limiting, based at least in part on said extracting, the at least a first search space and the at least a second search space;
pre-process the data for the at least one selected deep learning architecture based on the data pre-processing strategy; and
provide the pre-processed data as input to the selected deep learning architecture to perform the deep learning task.

10. The computer program product of claim 9, wherein the multi-objective learning process comprises training a recurrent neural network to rank combinations of deep learning architectures and data pre-processing strategies from the at least one search space, based on the data and the deep learning task, and wherein the combination is selected based on said ranking.

11. The computer program product of claim 10, wherein said training the recurrent neural network comprises:
selecting a candidate deep learning architecture from the plurality of deep learning architectures;
training a child network to convergence using the candidate deep learning architecture to obtain a validation accuracy; and
updating the recurrent neural network based on at least in part on the obtained validation accuracy.

12. The computer program product of claim 9, wherein the program instructions executable by a computing device further cause the computing device to:
output information to a graphical user interface explaining the selection of the optimal combination.

13. A system comprising:
a memory; and
at least one processor operably coupled to the memory and configured for:
obtaining data corresponding to a deep learning task;
performing, based on the deep learning task and the data, a multi-objective learning process to select a combination of (i) at least one deep learning architecture for said deep learning task and (ii) a data pre-processing strategy to be applied to the data, the data pre-processing strategy comprising one or more pre-processing steps, wherein performing the multi-objective learning process comprises:
implementing at least one search space, wherein the at least one search space comprises at least a first search space comprising a plurality of deep learning architectures and at least a second search space comprising a plurality of pre-processing steps;
extracting, from the data, (i) at least one data type, (ii) a task type associated with the deep learning task, and (iii) one or more performance metrics associated with the deep learning task; and
limiting, based at least in part on said extracting, the at least a first search space and the at least a second search space;
pre-processing the data for the at least one selected deep learning architecture based on the data pre-processing strategy; and
providing the pre-processed data as input to the selected deep learning architecture to perform the deep learning task.

14. The system of claim 13, wherein the multi-objective learning process comprises training a recurrent neural network to rank combinations of deep learning architectures and data pre-processing strategies from the at least one search space, based on the data and the deep learning task, and wherein the combination is selected based on said ranking.

15. A computer-implemented method, the method comprising:
obtaining data corresponding to a machine learning task;
iteratively sampling, based on the obtained machine learning task and the data, (i) a machine learning architecture from a plurality of machine learning architectures and (ii) at least one data pre-processing step for pre-processing said data from a plurality of data pre-processing steps, wherein performing the multi-objective learning process comprises:
implementing at least one search space, wherein the at least one search space comprises at least a first search space comprising the plurality of machine learning architectures and at least a second search space comprising the plurality of data pre-processing steps;
extracting, from the data, (i) at least one data type, (ii) a task type associated with the machine learning task, and (iii) one or more performance metrics associated with the machine learning task; and
limiting, based at least in part on said extracting, the at least a first search space and the at least a second search space; and
training, based on results of said sampling at each iteration, a recurrent neural network to identify, in combination, (i) a machine learning architecture from the plurality of machine learning architectures for said data and said machine learning task and (ii) one or more of the pre-processing steps for said machine learning architecture;
wherein the method is carried out by at least one computing device.

* * * * *